United States Patent
Watanabe et al.

(10) Patent No.: US 6,869,993 B2
(45) Date of Patent: Mar. 22, 2005

(54) POLYPROPYLENE-BASED RESIN COMPOSITION AND INJECTION MOLDED ARTICLE COMPRISING THE SAME

(75) Inventors: Tsuyoshi Watanabe, Ichihara (JP); Kenichi Okawa, Ichihara (JP)

(73) Assignee: Sumitomo Chemical Company, Limited, Osaka (JP)

(*) Notice: Subject to any disclaimer, the term of this patent is extended or adjusted under 35 U.S.C. 154(b) by 0 days.

(21) Appl. No.: 10/340,722

(22) Filed: Jan. 13, 2003

(65) Prior Publication Data

US 2004/0014854 A1 Jan. 22, 2004

(30) Foreign Application Priority Data

Jan. 24, 2002 (JP) ........................................ 2002-015302

(51) Int. Cl.$^7$ ................................................. C08K 5/20
(52) U.S. Cl. ........................ 524/210; 524/451; 524/502; 524/515; 524/528; 524/714
(58) Field of Search ................................. 524/210, 451, 524/502, 515, 528, 714

(56) References Cited

U.S. PATENT DOCUMENTS

| 5,585,420 A | 12/1996 | Grasmeder et al. |
| 6,576,693 B2 * | 6/2003 | Ogita et al. ................. 524/232 |
| 2003/0176555 A1 * | 9/2003 | Watanabe et al. ........... 524/451 |

FOREIGN PATENT DOCUMENTS

| JP | 8-506373 A | 7/1996 |
| JP | 10-36578 A | 2/1998 |

* cited by examiner

Primary Examiner—William Cheung
(74) Attorney, Agent, or Firm—Sughrue Mion, PLLC

(57) ABSTRACT

Disclosed are a polypropylene-based resin composition comprising (i) a resin composition comprising specific amounts of a propylene-ethylene block copolymer (A-1), a copolymer rubber of ethylene and α-olefin having from 3 to 20 carbon atoms (B), the copolymer rubber having a density of from 0.85 to 0.885 g/cm$^3$, an inorganic filler (C), and optionally a propylene homopolymer (A-2), and (ii) a small amount of an fatty acid amide (D). The resin composition is excellent in balance between rigidity and impact resistance and in scratch resistance.

13 Claims, No Drawings

POLYPROPYLENE-BASED RESIN COMPOSITION AND INJECTION MOLDED ARTICLE COMPRISING THE SAME

BACKGROUND OF THE INVENTION

1. Field of the Invention

The present invention relates to a polypropylene-based resin composition and to an injection molded article comprising the polypropylene-based resin composition. The present invention relates, more particularly, to a polypropylene-based resin composition excellent in balance between rigidity and impact resistance and in scratch resistance and to an injection-molded article comprising the polypropylene-based resin composition.

2. Description of the Related Art

Polypropylene-based resins have conventionally been used for materials for automobiles. In recent years, in the field of interior materials, demanded are materials excellent in balance between rigidity and impact resistance and in scratch resistance.

For example, JP, 8-506373,A discloses a filled polymer composition exhibiting an improved scratch whitening resistance, the composition comprising a polypropylene homopolymer, a low-density polyethylene having a density ranging from about 0.89 to about 0.935, talc and a fatty acid amide. However, further improvement has been requested with respect to the balance between rigidity and impact resistance.

SUMMARY OF THE INVENTION

The object of the present invention is to provide a polypropylene-based resin composition excellent in balance between rigidity and impact resistance and in scratch resistance and an injection-molded article comprising the polypropylene-based resin composition.

In such circumstances, the present inventors found, through their diligent investigations, that the above-mentioned problem can be solved by a polypropylene-based resin composition comprising specific amounts of a fatty acid amide, a propylene-ethylene block copolymer, a copolymer rubber of ethylene and an α-olefin having from 3 to 20 carbon atoms, an inorganic filler, and optionally a propylene homopolymer. Thus, they have reached the accomplishment of the present invention.

Namely, an aspect of the present invention relates to a polypropylene-based resin composition comprising 100 parts by weight of a resin composition comprising from 50 to 90% by weight of a propylene-ethylene block copolymer (A-1), from 5 to 25% by weight of a copolymer rubber of ethylene and α-olefin having from 3 to 20 carbon atoms (B), the copolymer rubber having a density of from 0.85 to 0.885 g/cm$^3$, and from 5 to 25% by weight of an inorganic filler (C), and from 0.1 to 1 part by weight of an fatty acid amide (D), provided that the sum of the amounts of the propylene-ethylene block copolymer (A-1), the copolymer rubber of ethylene and α-olefin having from 3 to 20 carbon atoms (B) and the inorganic filler (C) is 100% by weight.

Another aspect of the present invention relates to a polypropylene-based resin composition comprising 100 parts by weight of a resin composition comprising from 50 to 89% by weight of a propylene-ethylene block copolymer (A-1), from 1 to 20% by weight of a propylene homopolymer (A-2), from 5 to 25% by weight of a copolymer rubber of ethylene and α-olefin having from 3 to 20 carbon atoms (B), the copolymer rubber having a density of from 0.85 to 0.885 g/cm$^3$, and from 5 to 25% by weight of an inorganic filler (C), and from 0.1 to 1 part by weight of an fatty acid amide (D), provided that the sum of the amounts of the propylene-ethylene block copolymer (A-1), the propylene homopolymer (A-2), the copolymer rubber of ethylene and α-olefin having from 3 to 20 carbon atoms (B) and the inorganic filler (C) is 100% by weight.

Still another aspect of the present invention relates to an injection-molded article comprising any of the above-mentioned polypropylene-based resin compositions.

DETAILED DESCRIPTION OF PREFERRED EMBODIMENTS

The propylene-ethylene block copolymer (A-1) used in the present invention is a copolymer comprising a propylene homopolymer portion as a first segment and a propylene-ethylene random copolymer portion as a second segment.

Weight ratios of the propylene homopolymer portion, which is the first segment in the propylene-ethylene block copolymer (A-1) used in the present invention, and the propylene-ethylene random copolymer portion, which is the second segment, are from 95 to 60% by weight for the first segment and from 5 to 40% by weight for the second segment, preferably from 90 to 65% by weight for the first segment and from 10 to 35% by weight for the second segment, provided that the whole weight of the propylene-ethylene block copolymer (A-1) is let be 100% by weight.

The Q value (Mw/Mn), which is the ratio of the weight average molecular weight (Mw) to the number average molecular weight (Mn) and which indicates the molecular weight distribution of the first segment (propylene homopolymer portion) in the copolymer (A-1), is usually from 3 to 5, preferably from 3.5 to 4.5, from the viewpoint of flowability or balance between rigidity and impact resistance.

The isotactic pentad fraction of the first segment in the copolymer (A-1) is usually not less than 0.97, more preferably not less than 0.98 from the viewpoint of rigidity or heat resistance.

The ethylene content, (C2') EP, of the second segment in the copolymer (A-1) is usually from 25 to 55% by weight, more preferably from 30 to 50% by weight, from the viewpoint of impact resistance, provided that the whole amount of the second segment is let be 100% by weight.

The intrinsic viscosity, [η]EP, of the second segment is usually from 1 to 6 dl/g, more preferably from 2 to 5.5 dl/g, from the viewpoints of balance between rigidity and impact resistance, generation of pimples and surface quality.

The MFR of the copolymer (A-1) at 230° C. is usually not less than 25 g/10 min, preferably not less than 30 g/10 min from the viewpoint of formability.

The method for producing the copolymer (A-1) is not particularly restricted and includes a method in which the propylene homopolymer portion, which is the first segment, is produced in a first step an the propylene-ethylene random copolymer portion, which is the second segment, is produced in a second step.

In addition, can be mentioned a method in which the copolymer is produced by a known polymerization method using a known polymerization catalyst. The known polymerization catalyst includes e.g. Ziegler catalysts and metallocene catalysts. The known polymerization method includes e.g. slurry polymerization and gas phase polymerization.

As the propylene homopolymer (A-2) used in the present invention, can be employed propylene homopolymers the same as those mentioned as the propylene homopolymer which is the first segment of the propylene-ethylene block copolymer (A-1) used in the present invention.

The α-olefin having from 3 to 20 carbon atoms used in the copolymer rubber of ethylene and α-olefin having from 3 to 20 carbon atoms (B) used in the present invention is exemplified by propylene, 1-butene, isobutene, 1-pentene, 2-methyl-1-butene, 3-methyl-1-butene, 1-hexene, 2-methyl-1-pentene, 3-methyl-1-pentene, 4-methyl-1-pentene, 1-octene, 1-nonene, 1-decene, 1-undecene, 1-dodecene, etc. These may be used alone or in combination of two or more of them. Preferred are propylene, 1-butene, 1-hexene and 1-octene. More preferred are 1-butene, 1-hexene and 1-octene.

The density of the copolymer rubber (B) is from 0.85 to 0.885 g/cm$^3$, preferably from 0.85 to 0.875 g/cm$^3$, and more preferably from 0.85 to 0.87 g/cm$^3$. If the density exceeds 0.885 g/cm$^3$, the dispersibility to the propylene-ethylene block copolymer (A-1) maybe poor and may result in reduction in impact strength at room temperature and low temperatures.

The MFR of the copolymer rubber (B) at 190° C. is usually from 0.3 to 30 g/10 min, preferably from 0.5 to 20 g/10 min, from the viewpoint of impact strength.

The method for producing the copolymer rubber (B) is not particularly restricted and can be mentioned a method in which the copolymer is produced by a known polymerization method using a known polymerization catalyst. The known polymerization catalyst is exemplified by Ziegler-Natta catalyst systems made up, for example, of a vanadium compound, an organoaluminum compound and a halogenated ester compound, catalyst systems comprising a combination of an alumoxane or a boron compound and a metallocene compound in which a group with at least one cyclopentadienyl anion backbone is coordinated to titanium atom, a zirconium atom or a hafnium atom, which are so-called metallocene catalyst systems.

The known polymerization method is exemplified by a method in which ethylene and an α-olefin are copolymerized in an inert organic solvent such as a hydrocarbon compound.

The inorganic filler used in the present invention is not particularly restricted and is exemplified by talc, mica, wollastonite, calcium carbonate, barium sulfate, magnesium carbonate, clay, alumina, silica, calcium sulfate, carbon fiber, glass fiber, metal fiber, siliceous sand, carbon black, titanium oxide, magnesium hydroxide, zeolite, molybdenum, diatomaceous earth, sericite, calcium hydroxide, calcium sulfite, sodium sulfate, bentonite, and graphite. From the viewpoint of obtaining impact strength, luster or good appearance of molded articles, talc is preferred.

The talc is not particularly restricted, but the average particular diameter of talc (C) is usually not more than 10 μm, preferably not more than 5 μm. The average particle diameter of talc means a 50% particle diameter $D_{50}$ determined from an integrated distribution curve of the undersize method obtained by subjecting a suspension of the particle in a dispersion medium such as water, alcohol, or the like to measurement using a centrifugal settling type particle size distribution measuring device.

The talc may be employed as received without any treatment. Alternatively, it may be employed after treatment of its surface using a variety of known silane couplers, titanium couplers, or surfactants in order to improve the interfacial adhesiveness to the polypropylene-based resin and to improve the dispersibility to the polypropylene-based resin. The surfactant is exemplified by higher fatty acids, higher fatty acid esters, higher fatty acid amides and higher fatty acid salts.

The fatty acid amide (D) used in the present invention is a compound represented by a general formula $RCONH_2$ (in the formula, R denotes an alkyl or alkenyl group having from 5 to 21 carbon atoms) which is exemplified by lauramide, stearamide, oleamide, oleamide, behenamide, and erucamide. Preferred is erucamide. The incorporation amount is from 0.1 to 1 part by weight preferably from 0.1 to 0.5 part by weight, based on 100 parts by weight of a resin composition comprising a propylene-ethylene block copolymer (A-1), a copolymer rubber of ethylene and an α-olefin having from 3 to 20 carbon atoms (B) and an inorganic filler (C), or from 0.1 to 1 part by weight, preferably from 0.1 to 0.5 part by weight, based on 100 parts by weight of a resin composition comprising a propylene-ethylene block copolymer (A-1), a propylene homopolymer (A-2), a copolymer rubber of ethylene and an α-olefin having from 3 to 20 carbon atoms (B) and an inorganic filler (C).

If the incorporation amount of the fatty acid amide (D) exceeds 1 part by weight, fuming may occur during molding or it may bleed to the surface of a molded article. If less than 0.1 part by weight, the balance between rigidity and impact resistance and the scratch resistance, which are targets of the present invention, may be insufficient.

In a first embodiment of the present invention, the polypropylene-based resin composition comprises 100 parts by weight of a resin composition comprising a propylene-ethylene block copolymer (A-1), a copolymer rubber of ethylene and α-olefin having from 3 to 20 carbon atoms (B), the copolymer rubber having a density of from 0.85 to 0.885 g/cm$^3$, and an inorganic filler (C), wherein the propylene-ethylene block copolymer (A-1) accounts for from 50 to 90% by weight of the sum of the amounts of (A-1), (B) and (C), the copolymer rubber (B) accounts for from 5 to 25% by weight of the sum of the amounts of (A-1), (B) and (C), and the inorganic filler (C) accounts for from 5 to 25% by weight of the sum of the amounts of (A-1), (B) and (C), provided that the amounts of (A-1), (B) and (C) sum into 100% by weight, and from 0.1 to 1 part by weight of an fatty acid amide (D).

In the resin to which the fatty acid amid is incorporated, if the amount of the propylene-ethylene block copolymer (A-1) is less than 50% by weight, much amount of the copolymer rubber and the inorganic filler are contained and therefore it will become difficult to perform melt kneading, whereas if it is more than 90% by weight, the impact resistance will be insufficient. If the amount of the copolymer rubber (B) is less than 5% by weight, the impact resistance of the resin composition will be insufficient, whereas if it is more than 25% by weight, the resin composition will have an insufficient rigidity. If the amount of the inorganic filler (C) is less than 5% by weight, the rigidity of the resin composition will be insufficient, whereas if it is more than 25% by weight, the resin composition will have an insufficient impact resistance. With respect to the fatty acid amide (D), when the amount thereof is less than 0.1 part by weight, little effect of improving the scratch resistance can be achieved, whereas when it is more than 1 part by weight, there will arise problems of glass fogging or discoloration due to heat. The amounts of the propylene-ethylene block copolymer (A-1), the copolymer rubber (B) and the inorganic filler (C) are preferably from 55 to 82% by weight, from 8 to 20% by weight and from 10 to 25% by weight, respectively. The amount of the fatty acid amide (D) is preferably from 0.1 to 0.5 part by weight based on 100 parts by weight of the sum of the amounts of (A-1), (B) and (C).

On the other hand, in a second embodiment of the present invention, the polypropylene-based resin composition comprises 100 parts by weight of a resin composition comprising a propylene-ethylene block copolymer (A-1), a propylene homopolymer (A-2), a copolymer rubber of ethylene and α-olefin having from 3 to 20 carbon atoms (B), the copolymer rubber having a density of from 0.85 to 0.885 g/cm$^3$, and an inorganic filler (C), wherein the propylene-ethylene block copolymer (A-1) accounts for from 50 to 89% by weight of the sum of the amounts of (A-1), (A-2), (B) and (C), the propylene homopolymer (A-2) accounts for from 1 to 20% by weight of the sum of the amounts of (A-1), (A-2), (B) and (C), the copolymer rubber (B) accounts for from 5 to 25% by weight of the sum of the amounts of (A-1), (A-2), (B) and (C), and the inorganic filler (C) accounts for from 5 to 25% byweight of the sumof the amounts of (A-1), (A-2), (B) and (C), provided that the amounts of (A-1), (A-2), (B) and (C) sum into 100% by weight, and from 0.1 to 1 part by weight of an fatty acid amide (D).

In the resin to which the fatty acid amid is incorporated, if the amount of the propylene-ethylene block copolymer (A-1) is less than 50% by weight, much amounts of the rubber and inorganic filler are contained and therefore it will become difficult to perform melt kneading, whereas if it is more than 89% by weight, the impact resistance will be insufficient. If the amount of the propylene homopolymer (A-2) is more than 20% by weight, the impact resistance of the resin composition will be insufficient. If the amount of the copolymer rubber (B) is less than 5% by weight, the impact resistance of the resin composition will be insufficient, whereas if it is more than 25% by weight, the resin composition will have an insufficient rigidity. If the amount of the inorganic filler (C) is less than 5% by weight, the rigidity of the resin composition will be insufficient, whereas if it is more than 25% by weight, the resin composition will have an insufficient impact resistance. With respect to the fatty acid amide (D), when the amount thereof is less than 0.1 part by weight, little effect of improving the scratch resistance can be achieved, whereas when it is more than 1 part by weight, there will arise problems of glass fogging or discoloration due to heat. The amounts of the propylene-ethylene block copolymer (A-1), the propylene homopolymer (A-2), the copolymer rubber (B) and the inorganic filler (C) are preferably from 55 to 77% by weight, from 5 to 10% by weight, from 8 to 20% by weight and from 10 to 25% by weight, respectively. The amount of the fatty acid amide (D) is preferably from 0.1 to 0.5 part by weight based on 100 parts by weight of the sum of the amounts of (A-1), (A-2), (B) and (C).

The method for producing the polypropylene-based resin composition of the present invention may be a method in which the individual ingredients are mixed and kneaded. The apparatus used for the kneading includes a single screw extruder, a twin screw extruder, a Banbury mixer, a hot roll, and the like. The kneading temperature is usually from 170 to 250° C. and the kneading time is usually from 1 to 20 minutes. The mixing of individual ingredients may be carried out either simultaneously or separately.

The method for separate mixing the individual components is not particularly restricted and include, for example, the following methods (1) through (5):

(1) A method which comprises kneading a propylene-ethylene block copolymer (A-1) and an inorganic filler (C) and then adding a copolymer rubber of ethylene and α-olefin having from 3 to 20 carbon atoms (B) and a fatty acid amide (D).

(2) A method which comprises kneading an inorganic filler (C) previously in a high concentration with a propylene-ethylene block copolymer (A-1) to form a master batch, and then kneading the master batch while diluting with a propylene-ethylene block copolymer (A-1), a copolymer rubber of ethylene and α-olefin having from 3 to 20 carbon atoms (B), or a fatty acid amide (D).

(3) A method which comprises kneading a propylene-ethylene block copolymer (A-1) and a copolymer rubber of ethylene and α-olefin having from 3 to 20 carbon atoms (B), and then adding an inorganic filler (C) and a fatty acid amide and kneading.

(4) A method which comprises kneading a copolymer rubber of ethylene and α-olefin having from 3 to 20 carbon atoms (B) previously in a high concentration with a propylene-ethylene block copolymer (A-1) to form a master batch, and adding to it a propylene-ethylene block copolymer (A-1), an inorganic filler (C) and a fatty acid amide (D) and kneading.

(5) A method which comprises kneading previously a propylene-ethylene block copolymer (A-1) and an inorganic filler (C) and, separately, a propylene-ethylene block copolymer (A-1) and a copolymer rubber of ethylene and α-olefin having from 3 to 20 carbon atoms (B) and a fatty acid amid (D), and thereafter combining them and kneading.

In the methods (1) through (5), a propylene homopolymer (A-2) may optionally be mixed.

To the polypropylene-based resin composition of the present invention may be incorporated, as required, additives such as an antioxidant, an ultraviolet absorber, a pigment, an anti-static agent, a copper inhibitor, a flame retardant, a neutralizing agent, a foaming agent, a plasticizer, a nucleating agent, an anti-foaming agent and a crosslinking agent.

The injection molded article of the present invention is one obtained by a known injection molding of the polypropylene resin composition of the present invention.

Applications of the injection molded article of the present invention are not particularly restricted and examples thereof include automotive parts, parts of electric or electronic products and constructive parts. Preferred are automotive parts.

EXAMPLES

The present invention is illustrated by the following examples and comparative examples. The present invention, however, is not restricted to the examples.

The methods for measuring physical properties used in Examples and Comparative Examples are shown below.

(1) Melt Flow Rate (MFR, Unit: g/10 min)

Measurement was carried out according to the method provided in JIS K 6758. The measurement was carried out at a temperature of 230° C. and a load of 2.16 kg, unless otherwise stated.

(2) Flexural Modulus (Unit: MPa)

Measurement was carried out according to the method provided in JIS K 7203. Specimens molded by injection molding were used. Each specimen had a thickness 6.4 mm and was evaluated for flexural modulus under conditions including a span length of 100 mm and a load speed of 30 mm/min. The measurement was carried out at a temperature of 23° C.

(3) Izod Impact Strength (Unit: KJ/m$^2$)

Measurement was carried out according to the method provided in JIS K 7110. Specimens molded by injection molding were used. Each specimen had a thickness of 3.2 mm. Specimens with a notch resulting from notching after molding were evaluated for impact strength. The measurement was carried out at temperatures of 23° C. and −30° C.

(4) Ethylene Content (Unit: % by Weight)

The ethylene content was determined by a working curve method using the absorbance of characteristic absorptions of a methyl group (—CH$_3$) and a methylene group (—CH$_2$—) obtained by preparing a press sheet and measuring its infrared absorption spectrum.

(5) Intrinsic Viscosity ([η], Unit: dl/g)

Reduced viscosities were measured at three points of concentrations of 0.1, 2 and 0.5 g/dl using an Ubbellohde type viscometer. Intrinsic viscosity was calculated by a calculation method described at page 491 in "Kobunshi Yoeki (Polymer Solution), Kobunshi Jikkengaku (Polymer Experiment Study) 11" (published by Kyoritsu Shuppan K. K., 1982), namely, by an extrapolation method in which reduced viscosities are plotted against concentrations and the concentration is extrapolated in zero.

Regarding polypropylene, the intrinsic viscosity was measured at a temperature of 135° C. using tetralin as a solvent.

(6) Molecular Weight Distribution (Q Value)

Measurement was carried out by gel permeation chromatography (GPC) under the following conditions.

GPC: Model 150C manufactured by Waters

Column: Shodex 80 MA manufactured by Showa Denko, two columns

Amount of sample: 300 μl (Polymer concentration 0.2 wt %)

Flow rate: 1 ml/min

Temperature: 135° C.

Solvent: o-Dichlorobenzene

Using a standard polystyrene manufactured by Tosoh Corp., a working curve of eluted volume vs. molecular weight was made. Using the working curve, the weight average molecular weight (Mw) and the number average molecular weight (Mn), in terms of polystyrene, of the sample tested were determined and then a Q value=weight average molecular weight/number average molecular weight (Mw/Mn) was calculated as an index of molecular weight distribution.

(7) Isotactic Pentad Fraction

The isotactic pentad fraction was measured by a method reported and disclosed in A. Zambelli et al., Macromolecules, 6, 925 (1973). Namely, determined was a fraction of isotactic chains in the form of pentad unit in a polypropylene molecule chain, in other words, a fraction of propylene monomer units existing in the center of a chain in which five propylene monomer units are meso-bonded measured by use of $^{13}$C-NMR. However, the assignment of NMR absorption peaks was conducted based on Macromolecules, 8, 687 (1975) published thereafter.

Specifically, the isotactic pentad fraction was measured as an area fraction of mmmm peaks in all the absorption peaks in the methyl carbon region of a $^{13}$C-NMR spectrum. According to this method, the isotactic pentad fraction of an NPL standard substance, CRM No. M19-14 Polypropylene PP/MWD/2 available from NATIONAL PHYSICAL LABORATORY, G.B. was measured to be 0.944.

(8) Weight Ratio of Propylene-Ethylene Random Copolymer Portion to the Whole Block Copolymer in Propylene-Ethylene Block Copolymer (X, % by Weight)

In a propylene-ethylene block copolymer, the weight ratio, X (% by weight), of a propylene-ethylene random copolymer portion to the whole block copolymer is determined according to the following equation after the measurement of the amounts of heat of crystal fusion of the propylene homopolymer portion and the whole block copolymer.

$$X=1-(\Delta Hf)T/(\Delta Hf)P$$

(ΔHf)T=Amount of heat of fusion of the whole block copolymer (cal/g)

(ΔHf)P=Amount of heat of fusion of propylene homopolymer portion (cal/g)

(9) Ethylene Content of Propylene-Ethylene Random Copolymer Portion (Unit: % by Weight) in Propylene-Ethylene Block Copolymer The ethylene content of a propylene-ethylene random copolymer portion in a propylene-ethylene block copolymer was determined by calculation according to the following equation after the measurement of the ethylene content (% by weight) of the whole block copolymer by an infrared absorption spectrum method.

$$(C2')EP=(C2')T/X$$

(C2')T=Ethylene content of the whole block copolymer (% by weight)

(C2')EP=Ethylene content of propylene-ethylene random copolymer portion (% by weight)

(10) Intrinsic Viscosity of Propylene-Ethylene Random Copolymer Portion ([η]EP, Unit: dl/g) in Propylene-Ethylene Block Copolymer The intrinsic viscosity, [η]EP, of the propylene-ethylene random copolymer portion in a propylene-ethylene block copolymer is determined by calculation according to the following equation after the measurement of intrinsic viscosities of a propylene homopolymer portion and the whole block copolymer.

$$[\eta]EP=[\eta]T/X=(1/X-1)[\eta]P$$

[η]P: Intrinsic viscosity of propylene homopolymer portion (dl/g)

[η]T: Intrinsic viscosity of the whole block copolymer (dl/g)

The intrinsic viscosity, [η]P, of the propylene homopolymer portion, which is the first segment of the propylene-ethylene block copolymer, was determined using a propylene homopolymer separated from a polymerization tank after the production of the propylene homopolymer portion, which is a first step, during the production of the propylene-ethylene block copolymer.

(11) Scratch Resistance Test

Using a special large-sized scratch tester, Model U-F, manufactured by UESHIMA SEISAKUSYO CO., LTD., a scratch test was carried out under the following conditions:

(a) A scratch was made at a rate of 600 mm/min on a 100 mm by 400 mm by 3 mm mirror-finished flat board by putting a weight of 500 g to a needle used for scratch test the tip of which is a hemisphere (material: SUS403) 1 mm in diameter.

(b) Method for evaluating scratch

Using a surface roughness and contour profile measuring instrument (SURFCOM 550A) manufactured by TOKYO SEIMITSU CO., LTD., scratches on the surface of the flat board was measured. For evaluating the noticeability of scratches, the depth from the swelled portion formed along a scratch to the bottom of the scratch was measured in a unit of 0.1 μm.

Examples 1 to 5 and Comparative Examples 1 to 3
(Sample)
(A-1) Propylene-ethylene Block Copolymer
(1) Propylene-ethylene block copolymer (BC-1)

Used was AZ564, manufactured by Sumitomo Chemical Co., Ltd., which had an MFR (230° C.) of 30 g/10 min.

The propylene homopolymer portion (first segment) had a molecular weight distribution (Q value) of 4.0, an intrinsic viscosity ([η]P) of 1.05 dl/g and an isotactic pentad fraction of 0.97. The propylene-ethylene random copolymer portion (second segment) had an intrinsic viscosity ([η]EP) of 4.0 dl/g, a weight ratio to the propylene-ethylene block copolymer (BC-1) of 16% by weight and an ethylene content of 45% by weight.

(A-2) Propylene Homopolymer
(1) Propylene homopolymer (PP-1)

Used was a propylene homopolymer having a molecular weight distribution (Q value) of 4.1, an intrinsic viscosity ([η]P) of 0.90 dl/g, an isotactic pentad fraction of 0.97 and an MFR (230° C.) of 120 g/10 min.

(2) Propylene homopolymer (PP-2)

Used was Y501N, manufactured by Sumitomo Chemical Co., Ltd., which had a molecular weight distribution (Q value) of 4.1, an intrinsic viscosity ([η]P) of 1.45 dl/g, an isotactic pentad fraction of 0.97 and an MFR (230° C.) of 13 g/10 min.

(B) Copolymer Rubber

As copolymer rubbers, the following ethylene-1-octene copolymer rubbers (EOR-1 to EOR-5) were used.

(1) EOR-1

ENGAGE 8842 manufactured by DuPont Dow Elastomers L.L.C. (density: 0.858 g/cm$^3$, MFR (190° C.): 1 g/10 min)

(2) EOR-2

ENGAGE 8200 manufactured by DuPont Dow Elastomers L.L.C. (density: 0.870 g/cm$^3$, MFR (190° C.): 5 g/10 min)

(3) EOR-3

ENGAGE 8150 manufactured by DuPont Dow Elastomers L.L.C. (density: 0.870 g/cm$^3$, MFR (190° C.): 0.5 g/10 min)

(4) EOR-4

Affinity PL1880 manufactured by DuPont Dow Elastomers L.L.C. (density: 0.901 g/cm$^3$, MFR (190° C.): 1.1 g/10 min)

(5) EOR-5

Affinity PL1140 manufactured by DuPont Dow Elastomers L.L.C. (density: 0.895 g/cm$^3$, MFR (190° C): 1.7 g/10 min)

(C) Inorganic Filler

As an inorganic filler, used was talc (MWHST manufactured by Hayashi Kasei Co., Ltd.), which is referred to as Talc-1.

Talc-1 had an average particle diameter of 2.7 μm.

(D) Fatty Acid Amide

As a fatty acid amide, erucamide, NewS, manufactured by Nippon Fine Chemical Co., Ltd. was used.

(Polypropylene-based Resin Composition)

Polypropylene-based resin compositions were produced by the following method. A propylene-ethylene block copolymer (BC-1), propylene homopolymers (PP-1 and PP-2), ethylene-1-octene copolymer rubbers (EOR-1 to 5), talc (Talc-1) and erucamide (NewS) were weighed in the compositions given in Table 1. These were pre-mixed uniformly with a Henschel mixer and a tumbler. Subsequently, polypropylene-based resin compositions were produced using a twin-screw extruder (TEX44SS-31. 5BW-2V manufactured by The Japan Steel Works, Ltd.) at an extrusion rate of 30 kg/hr, a screw speed of 900 rpm under vent suction. The polypropylene-based resin compositions were measured for MFR. The results are shown in Table 2.

(Injection Molded Article)

Specimens for physical property evaluation were prepared under the following injection molding conditions. The polypropylene-based resin compositions obtained above were dried in a hot air dryer at 120° C. for 2 hours and then injection molded using an injection molding machine manufactured by Toshiba Machine Co., Ltd. Model IS150E-V at a molding temperature of 220° C., a mold cooling temperature of 50° C., an injection time of 15 sec and a cooling time of 30 sec. The injection molded articles obtained were measured for flexural modulus and Izod impact strength. The results are shown in Table 2.

A flat board for a scratch test was prepared under the following injection molding conditions. The polypropylene-based resin compositions obtained above were dried in a hot air dryer at 120° C. for 2 hours and then injection molded using an injection molding machine manufactured by Sumitomo Heavy Industries, Ltd., Neomat Model 515/150, at a molding temperature of 220° C., a mold cooling temperature of 50° C., at an injection time and an pressure hold time, in total, of 15 sec and a cooling time of 30 sec. The injection molded articles obtained were subjected to a scratch test. The results are shown in Table 2.

TABLE 1

| | Composition (% by weight) | | | | | NewS (Part by weight) |
|---|---|---|---|---|---|---|
| | BC-1 | PP-1 | PP-2 | EOR | Talc-1 | |
| Example 1 | 52 | 9 | — | EOR-1 15 | 24 | 0.2 |
| Example 2 | 52 | 9 | — | EOR-2 15 | 24 | 0.2 |
| Example 3 | 52 | — | 9 | EOR-2 15 | 24 | 0.2 |
| Example 4 | 54 | — | 9 | EOR-2 13 | 24 | 0.2 |
| Example 5 | 52 | 9 | — | EOR-3 15 | 24 | 0.2 |
| Comparative Example 1 | 52 | 9 | — | EOR-4 15 | 24 | 0.2 |
| Comparative Example 2 | 52 | 9 | — | EOR-5 15 | 24 | 0.2 |
| Comparative Example 3 | 52 | 9 | — | EOR-1 15 | 24 | — |

TABLE 2

| | MFR (g/10 min.) | Flexural Modulus (MPa) | Izod Impact Strength (KJ/m$^2$) | | Scratch Test (μm) |
|---|---|---|---|---|---|
| | | | 23° C. | −30° C. | |
| Example 1 | 20 | 2220 | 61 | 3.7 | 10.5 |
| Example 2 | 25 | 2240 | 49 | 3.9 | 10.5 |
| Example 3 | 20 | 2160 | 51 | 3.4 | 11.5 |
| Example 4 | 22 | 2300 | 46 | 2.8 | 10.5 |

TABLE 2-continued

|  | MFR (g/10 min.) | Flexural Modulus (MPa) | Izod Impact Strength (KJ/m²) | | Scratch Test (μm) |
| --- | --- | --- | --- | --- | --- |
| | | | 23° C. | −30° C. | |
| Example 5 | 18 | 2320 | 57 | 3.6 | 11.0 |
| Comparative Example 1 | 19 | 2430 | 25 | 2.1 | 9.0 |
| Comparative Example 2 | 19 | 2420 | 29 | 2.2 | 8.0 |
| Comparative Example 3 | 20 | 2220 | 62 | 3.6 | 21.5 |

It is clear that Examples 1 through 5, which satisfy the requirements of the present invention, are excellent in balance between rigidity and impact resistance and in scratch resistance.

Contrary to this, it is also clear that Comparative Examples 1 and 2, which do not satisfy the density of the copolymer rubber (B) of ethylene with an α-olefin containing from 3 to 20 carbon atoms, which is a requirement of the present invention, are insufficient in impact resistance (Izod impact strength at 23° C. and −30° C.) and that Comparative Example 3 which used no fatty acid amide, which is a requirement of the present invention, is insufficient in scratch resistance.

As described above in detail, by the present invention, a polypropylene-based resin composition excellent in balance between rigidity and impact resistance and in scratch resistance and an injection molded article made up of the polypropylene-based resin composition can be obtained.

What is claimed is:

1. A polypropylene-based resin composition comprising
100 parts by weight of a resin composition comprising from 50 to 90% by weight of a propylene-ethylene block copolymer (A-1), from 5 to 25% by weight of a copolymer rubber of ethylene and α-olefin having from 3 to 20 carbon atoms (B), the copolymer rubber having a density of from 0.85 to 0.885 g/cm³, and from 5 to 25% by weight of an inorganic filler (C), and
from 0.1 to 1 part by weight of an fatty acid amide (D).

2. A polypropylene-based resin composition comprising
100 parts by weight of a resin composition comprising from 50 to 89% by weight of a propylene-ethylene block copolymer (A-1), from 1 to 20% by weight of a propylene homopolymer (A-2), from 5 to 25% by weight of a copolymer rubber of ethylene and α-olefin having from 3 to 20 carbon atoms (B), the copolymer rubber having a density of from 0.85 to 0.885 g/cm³, and from 5 to 25% by weight of an inorganic filler (C), and
from 0.1 to 1 part by weight of an fatty acid amide (D).

3. The polypropylene-based resin composition according to claim 1 or 2, wherein the α-olefin used in the copolymer rubber of ethylene and α-olefin having from 3 to 20 carbon atoms is 1-butene, 1-hexene or 1-octene.

4. The polypropylene-based resin composition according to claim 1 or 2, wherein the inorganic filler (C) is talc.

5. The polypropylene-based resin composition according to claim 1 or 2, wherein the fatty acid amide (D) is erucamide.

6. An injection molded article comprising the polypropylene-based resin composition according to claim 1 or 2.

7. The injection molded article according to claim 6, wherein the injection molded article is an automotive part.

8. An injection molded article comprising the polypropylene-based resin composition according to claim 3.

9. An injection molded article comprising the polypropylene-based resin composition according to claim 4.

10. An injection molded article comprising the polypropylene-based resin composition according to claim 5.

11. The injection molded article according to claim 8, wherein the injection molded article is an automotive part.

12. The injection molded article according to claim 9, wherein the injection molded article is an automotive part.

13. The injection molded article according to claim 10, wherein the injection molded article is an automotive part.

* * * * *